United States Patent [19]

Mirtain et al.

[11] 4,258,774
[45] Mar. 31, 1981

[54] REINFORCEMENT BELT FOR A PNEUMATIC TIRE

[75] Inventors: Henri J. Mirtain; Jacques Vervin, both of Compiegne, France

[73] Assignee: Uniroyal, a Societe Anonyme, Clairoix, France

[21] Appl. No.: 892,065

[22] Filed: Mar. 31, 1978

[30] Foreign Application Priority Data

Apr. 13, 1977 [FR] France ................................ 77 11117

[51] Int. Cl.³ ................................................ B60C 9/18
[52] U.S. Cl. ............................ 152/361 FP; 152/209 R
[58] Field of Search ...................... 152/361 FP, 209 R

[56] References Cited

U.S. PATENT DOCUMENTS

| | | | |
|---|---|---|---|
| 3,404,721 | 10/1968 | Massoubre | 152/361 FP |
| 3,623,529 | 11/1971 | Fausti | 152/361 FP |
| 3,690,364 | 9/1972 | Barassi et al. | 152/361 FP |
| 3,757,844 | 9/1973 | Verdier | 152/361 FP |
| 3,881,538 | 5/1975 | Mirtain | 152/361 FP |
| 3,949,797 | 4/1976 | Mirtain et al. | 152/361 FP |
| 4,042,742 | 8/1977 | Bergomi | 152/361 FP |
| 4,050,497 | 9/1977 | Pakur et al. | 152/361 FP |
| 4,170,255 | 10/1979 | Greiner et al. | 152/361 FP |

FOREIGN PATENT DOCUMENTS

| | | | |
|---|---|---|---|
| 952419 | 8/1974 | Canada | 152/361 FP |
| 1228241 | 3/1960 | France | 152/361 FP |

*Primary Examiner*—Richard A. Bertsch
*Attorney, Agent, or Firm*—Charles A. Blank

[57] ABSTRACT

A reinforcement belt for a pneumatic tire includes at least three superpositioned plies of filiform elements. A first ply having two free lateral edges has at least one lateral edge portion folded over to create a skirt with the balance of the first ply forming a main portion having an axial width substantially equal to the axial width of the reinforcement belt. The filiform elements in this first ply are of aromatic polyamide composition and have a high modulus of elasticity. A second ply extends parallel to the first ply over an axial distance at least equal to the axial spacing of the two free lateral edges of the first ply. The filiform elements in the second ply may be either of aromatic polyamide or steel composition. A third ply of filiform elements of steel extends into the median zone of the belt and has an axial width which is less than, equal to or greater than the distance separating the free edges of the first ply. Various orientations of the plies are disclosed.

7 Claims, 12 Drawing Figures

REINFORCEMENT BELT FOR A PNEUMATIC TIRE

BACKGROUND OF THE INVENTION

1. Field Of The Invention

This invention relates to pneumatic tires, and more particularly to tread reinforcements or reinforcement belts for radial ply tires.

2. Prior Art

It is known in the tire industry to provide pneumatic tire constructions which include an annular reinforcement belt or breaker assembly about the periphery of the tire between the tread and the carcass. It has been found that such a pneumatic tire construction enhances the road stability of the tire and increases the tread life in both radial and bias ply constructions. Usually, the reinforcement belt consists of one or more annular bands which may be positioned parallel and concentrically adjacent to one another. These bands almost universally contain cords of organic, steel or glass materials which may be oriented on a bias angle from the equatorial plane of the tire. A major problem attending such reinforcement belt constructions is that of belt edge separation which generally arises from road stresses acting in the shoulder regions of the tire where the edges of the belts lie. These stresses are caused primarily by the rotation of the load-bearing tire into its contact patch with the pavement. It is the continual change in shape of the cross-section of the tire that causes the stresses, concentrating them in the shoulder regions. Since the belt edges within the shoulder region usually contain exposed ends of the bias oriented inextensible cords, the interface between the cords and the surrounding rubber is often the weakest bond area between the belts and the tire carcass. The shoulder region stresses have a tendency to cause a separation of the cord ends from the adjacent rubber, therefore resulting in a gradual ply separation.

Several variations in reinforcement belt constructions have been designed in an attempt to overcome the above difficulties. Specifically, there is disclosed in U.S. Pat. No. 3,881,538 a multi-ply reinforcing breaker consisting of a plurality of superimposed plies which decrease successively in span axially of the tire from the radially innermost ply to the radially outermost ply. The innermost ply is folded at its end to in part overlap at least one of the other plies to resist edge separation of the plies. Other reinforcement belts containing folded plies are described in U.S. Pat. Nos. 3,757,844, 3,949,797 and Canadian Pat. No. 952,419.

Usually, the various plies consist of steel cables or cords encased in rubber. The use of steel cables in the plies which give the belt increased structural rigidity leads to a harsher riding tire. It has been proposed to use materials consisting of aromatic polyamides, for instance those referred to as Aramides which have a modulus of elasticity preferably in excess of 3,500 kg/sq. mm or 260 gram/denier. Indeed, this material has attractive qualities of elasticity, toughness, low elongation, low specific mass, etc., under such conditions that it reduces the tendancy to separate or tear off the belt plies, specifically in the areas of the lateral edges of the plies, at least as long as an excessive speed has not been attained.

Construction for reinforcement belts including one or more non-metallic cord plies are detailed in U.S. Pat. Nos. 3,404,721, 3,690,364, 3,881,538, 3,949,797 and French Pat. No. 1,228,241. In several instances in which non-metallic cords are used, the softer riding characteristics and lighter weight attributable to the non-metallic cords are outweighed by the reduced structural integrity of the reinforcement belt structure.

Furthermore, known approaches to reinforcement belt designs do not provide completely satisfactory solutions to the problems of tire stiffness and shoulder fatigue.

It is toward the elimination of these and other drawbacks that the present invention is directed.

SUMMARY OF THE INVENTION

1. Purposes Of The Invention

It is an object of the present invention to provide a pneumatic tire having an improved reinforcement belt.

Another object of the present invention is to provide a novel and improved belted pneumatic tire with a reinforcement belt constructed to provide desirable qualities of road-holding ability, driving comfort, lightness in weight, high speed capability and high wear resistance.

Other objects of the present invention, in part will be obvious and in part will become apparent as the description proceeds.

2. Brief Description Of The Invention

Generally, the above and other objects of the present invention are accomplished by a pneumatic tire having a radial carcass and a reinforcement belt or breaker placed between the crown region of the carcass and the tread. The reinforcement belt includes at least three radially superpositioned plies of filiform elements which elements are substantially parallel to one another in each ply. A first ply having free lateral edges has at least one lateral edge portion folded over to form a skirt with the balance of the first ply forming a main portion having an axial width substantially equal to the width of the reinforcement belt. The filiformm elements in this first ply are of an aromatic polyamide having a high modulus of elasticity. A second ply extends parallel to the first ply over an axial extent at least equal to the axial spacing of the two free lateral edges of the folded first ply. Preferably the second ply has an axial extent substantially equal to that of the main portion of the folded ply. In the second ply the filiform elements are either of aromatic polyamide or steel composition. A third ply of steel elements is provided which extends into the median zone of the reinforcement belt and has an axial width which may be less than, equal to or greater than the axial distance between the two free ends of the folded over first ply.

The three plies may be superimposed in various combinations as will be detailed hereinbelow. The invention consists of the features of construction and arrangement of parts which will be detailed hereinafter and described in the appended claims.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

DESCRIPTION OF THE PREFERRED EMBODIMENTS

In the specification and the claims, the terms "axially inward" and "axially outward" are used with reference to a sidewall of the tire, that is, "axially inward" refers to a vector extending from the sidewall to the opposite sidewall. Conversely, "axially outward" refers to a vector extending outwardly away from a sidewall. The terms "radially inward" and "radially outward" are used with reference to the axis of rotation of the tire, that is, "radially inward" refers to a vector extending from the tread profile of the tire to the axis, while, the term "radially outward" refers to a vector extending from the axis toward the tread profile. The term "filiform element" designates either a twisted cord composed of strands, an isolated strand or a spun yarn.

Figure 1:
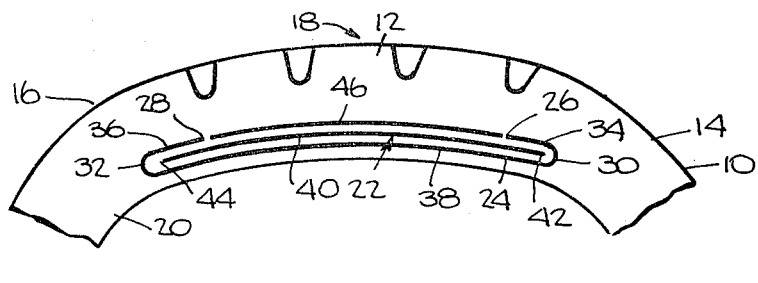
FIG. 1 represents a radial cross-sectional profile of a portion of a pneumatic tire including a reinforcement belt constructed pursuant to one embodiment of the present invention.

Referring now to the drawings, there is illustrated in FIG. 1, a portion of a pneumatic tire identifed generally by the reference numeral 10. The tire 10 has a crownn region 12 defined by the shoulders 14 and 16 any by a tread portion 18. In addition, the tire 10 is provided with a carcass 20 which may be built in any conventional manner and if of radial construction includes radially extending reinforcing threads or cords (not shown).

Positioned between the carcass 20 and the tread portion 18 is a reinforcement belt or breaker in accordance with one embodiment of the present invention which is identified generally by the reference numeral 22. The reinforcement belt 22 is substantially coextensive with the tread portion 18 and it circles, peripherially, the carcass 20.

The reinforcement belt 22 includes at least three plies of filiform elements in which the elements are substantially parallel to one another in each ply and coated with a natural or synthetic elastomer.

A first ply 24 constitutes the radially innermost ply of the reinforcement belt and has two free lateral edges or free edges 26 and 28. The ply has two foldings 30 and 32 lying substantially at each lateral edge of the reinforcement belt in order to create two lateral skirts 34 and 36, folded radially outwardly with respect to a main portion 38. The main portion 38 has an axial extent substantially equal to the axial width of the reinforcement belt. As noted hereinabove the first ply 24 contains filiform elements and these are of an aromatic polyamide composition having a high modulus of elasticity, preferably in excess of 3,500 kg/sq. mm.

A second ply 40 is superimposed on the main portion 38 on its radially outward side and extends parallel to the first ply 24. It has an axial width at least equal to the distance between the two free edges 26 and 28 so that the skirts 34 and 36 can be folded over the lateral edges 42 and 44 of the second ply 40 as shown. The filiform elements in the second ply 40 may be either or an aromatic polyamide, similar to that utilized in the first ply 24, or may be of steel.

A third ply 46 of steel elements is superimposed on the second ply 40 and extends from the free edge 26 to the free edge 28.

Figure 1A:
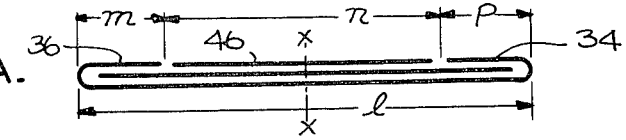
FIG. 1A represents an enlarged transverse cross-sectional view of the reinforcement belt shown in FIG. 1.

In the embodiment illustrated in FIG. 1, and also shown in FIG. 1A, the axial width "m" of the skirt 36 plus the axial width "p" of the skirt 34 plus the axial width "n" of the third ply 46 are equal to "1", the axial width of the reinforcement belt. In other words, the third ply 46 abuts the free edges 26 and 28 on the skirts 34 and 36 respectively. The third ply 46 also extends into the median zone of the reinforcement belt as shown.

In the alternative embodiments of the present invention which are illustrated in FIGS. 2-11, and which will be discussed hereinbelow, only the reinforcement belts are illustrated.

Figure 2:
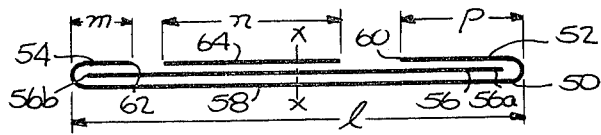
FIGS. 2-11 show, schematically, transverse cross-sections of reinforcement belts constructed in accordance with alternative embodiments of the present invention.

In the alternative embodiment illustrated in FIG. 2, a first ply 50 has radially outwardly folded portions or skirts 52 and 54. The second ply 56 has an axial extent which is less than the axial width of the main portion 58 of the first ply which corresponds to the axial width of the reinforcement belt, but which is greater than the distance between the free edges 60 and 62 on the skirts 52 and 54 respectively. In this embodiment as in the one illustrated in FIGS. 1 and 1A, the skirts 52 and 54 are folded onto the lateral edges 56a and 56b of the second ply 56. A third ply 64 is positioned between the free edges 60 and 62. In this embodiment, the axial width of the skirt 52 denoted by the letter "p" plus the axial width of the skirt 54 denoted by the letter "m" plus the axial width of the third ply 64, "n", is less than the axial width "1" of the reinforcement belt. Third ply 64 does not abut the free edges 60 and 62. Moreover, as shown, the axial width "p" of the skirt 52 may be greater than the axial width "m" of the skirt 54.

Figure 3:
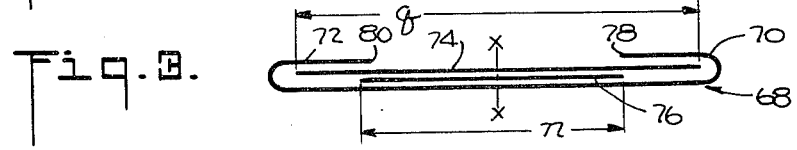

Another alternative embodiment for the reinforcement belt is illustrated in FIG. 3 and incorporates a first ply 68 having skirts 70 and 72 which are folded radially outwardly over both a second ply 74 and a third ply 76 which is positioned between the first and second plies. The third ply 76 has an axial width "n" less than the axial width "q" of the second ply 74 The width "q" of the second ply 74 is, as in the embodiments illustrated in FIGS. 1 and 2 above, less than the full axial width of the reinforcement belt but greater than the distance between the free edges 78 and 80 on the skirts 70 and 72 respectively.

Figure 4:
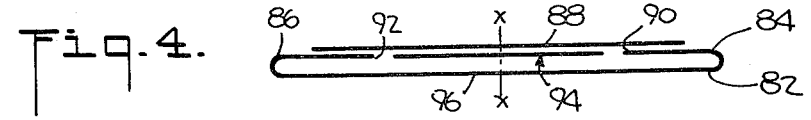

Another alternative embodiment is shown in FIG. 4 in which a first ply 82 has radially outwardly folded skirts 84 and 86 as shown. A second ply 88 is superimposed upon the skirts 84 and 86 and is of an axial width sufficient to bridge the two free edges 90 and 92 on the skirts 84 and 86 respectively. A third ply 94 is positioned axially between the edges 90 and 92 and radially between the main portion 96 of the first ply 82 and the second ply 88. In this embodiment the second ply 88 overlaps the third ply 94 in its entirety as well as the free edges 90 and 92.

Figure 5:

The alternative embodiment illustrated in FIG. 5 includes a folded first ply 98 with skirts 100 and 102. Positioned on the skirts 100 and 102 in a manner similar to that embodiment illustrated in FIG. 4 is a second ply 104 which extends over the free edges 106 and 108. Superimposed upon the second ply 104 is a third ply 110 which has an axial extent greater than the distance between the free edges 106 and 108.

Figure 6:
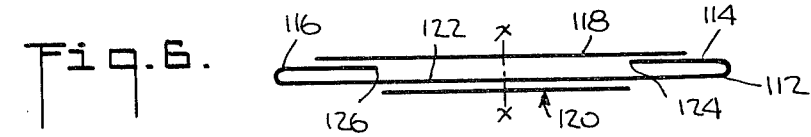

In FIG. 6, a further alternative embodiment is shown in which a first ply 112 has radially outwardly folded skirts 114 and 116 over which is positioned a second ply 118 in direct contact with the skirts 114 and 116. This embodiment differs from those discussed hereinabove in that a third ply 120 is positioned radially inwardly of the main portion 122 on the first ply 122. The third ply 120 may have an axial width equal to or grater than the spece between the free edges 124 and 126 of the first ply.

Figure 7:
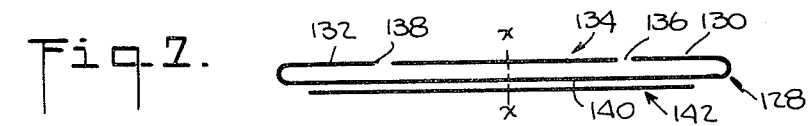

The alternative embodiment of FIG. 7 has a first ply 128 with skirts 130 and 132. A third ply 134 is positioned between free edges 136 and 138 respectively. Positioned radially inwardly of the main portion 140 is a second ply 142.

Figure 8:
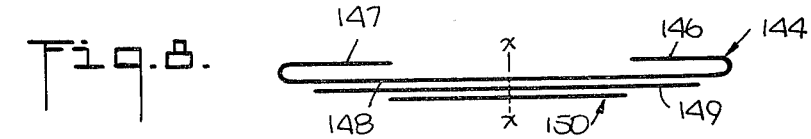

In the alternative embodiment shown in FIG. 8, a first ply 144 is provided with skirts 146 and 147. Superimposed upon the first ply 144 radially inwardly of the main portion 148 is a second ply 149. A third ply 150 is positioned immediately adjacent the second ply 149 and radially inwardly of the first ply 144.

Figure 9:

A further alternative embodiment is shown in FIG. 9 wherein a first ply 152 is provided with radially outwardly folded skirts 154 and 156 which overlap a second ply 158 as shown. A third ply 160 is superimposed upon the skirts 154 and 156 and extends axially beyond the free edges 162 and 164 on the skirts 154 and 156 respectively.

Figure 10:
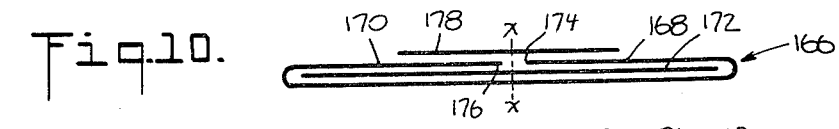

In the alternative embodiment of FIG. 10, a first ply 166 has skirts 168 and 170 folded radially outwardly upon a second ply 172. The free edges 174 and 176 on the skirts 168 and 170 respectively may be spaced slightly from each other or may abut each other. Superimposed on the free edges 174 and 176 is a third ply 178.

Figure 11:

There is shown in FIG. 11 yet another embodiment of the present invention in which a first ply 180 has only one radially outward fold 82 to create a skirt 184. Placed adjacent but spaced from the free edge 186 of the first ply 180 on the skirt 184 is a third ply 188 which extends into the median zone of the reinforcement belt. A second ply 190 extends from the fold 182 over the skirt 184, the free edge 186 as well as the third ply 188 as shown. In this embodiment, the fold 182 may be located on either the axially inward, or axially outward edge of the reinforcement belt.

In the embodiments illustrated in FIGS. 1–11 the axis of the pneumatic tire containing the reinforcement belt is situated beneath the particular cross-sectional representation so that the skirts created by the folds in the first ply are positioned radially outwardly of the main portion of the first ply. It is to be understood that without deviating from the intent of the present invention, the axis could be situated above the reinforcement belts illustrated so that the skirts created by the folds in the first ply will be positioned radially inwardly of the main portion of the first ply. Furthermore, where the skirts of the first ply are shown folded radially outwardly, they may alternatively be folded radially inwardly with the orientation of the three plies remaining unchanged.

In the various embodiments discussed hereinabove, the filiform elements of the first ply are formed from an aromatic polyamide composition having a modulus of elasticity preferably in excess of 3,500 kg/sq. mm. The filiform elements in the second ply may be of either steel or aromatic polyamide and preferably are of the latter. The filiform elements in the third ply are of steel. As to the angle of orientation of the elements in the various plies, the elements in the main portions of the first ply lie at an angle of from about 10° to about 30° with respect to the equatorial plane X—X of the tire. Consequently, the filiform elements in the skirt portions of the first ply will lie at an angle intersecting the filiform elements of the main portion, with the angle accordingly being between 20° and 60°. The filiform elements in the second plies lie at an angle of from about 10° to about 30° with respect to the equatorial plane X—X of the tire and the filiform elements in the third plies lie at an angle of from about 20° to about 90° with respect to the equatorial plane.

It can be seen from the foregoing that the objects of the present invention namely, to achieve an improved reinforcement belt for a pneumatic tire, are accomplished by the utilization of a first ply of aromatic polyamide filiform elements which is folded along at least one lateral edge to create at least one skirt. A second ply of filiform elements which may be either steel or aromatic polyamide is positioned with respect to the skirt so as to extend beyond the free edge on the skirt. A third ply of steel filiform elements extends into the median zone of the belt and is located with respect to the first and second plies to contribute structural rigidity to the reinforcement belt. The utilization of the first two plies of aromatic polyamide filiform elements results in the reinforcement belt being considerably lighter in weight than those manufactured pursuant to current designs.

While in accordance with the patent statutes preferred embodiments of the present invention are set forth and described in detail, it is to be understood that the present invention is not limited thereto or thereby.

What is claimed is:

1. A pneumatic tire including:
    a carcass having a crown region;
    a tread portion surrounding said crown region; and
    a tread reinforcement belt disposed circumferentially about said crown region, between said carcass and said tread, said reinforcement belt comprising:
    a first ply with two free lateral edges having two lateral edge portions folded radially outwardly over upon said first ply to form skirts with the balance of said first ply forming a main portion having an axial width substantially equal to the axial width of said reinforcement belt;
    a second ply extending parallel to said first ply having an axial width greater than the axial distance between said free edges of said first ply and disposed between said skirts and said main portion of said first ply; and
    a third ply extending at least into the median zone of said reinforcement belt and disposed between said second ply and said main portion of said first ply.

2. A pneumatic tire including:
    a carcass having a crown region;
    a tread portion surrounding said crown region; and
    a tread reinforcement belt disposed circumferentially about said crown region, between said carcass and said tread, said reinforcement belt comprising:
    a first ply with two free lateral edges having two lateral edge portions folded radially outwardly over upon said first ply to form skirts with the balance of said first ply forming a main portion having an axial width substantially equal to the axial width of said reinforcement belt;
    a second ply extending parallel to said first ply having an axial width greater than the axial distance between said free edges of said first ply and disposed between said skirts and said main portion of said first ply; and
    a third ply extending at least into the median zone of said reinforcement belt and disposed radially outwardly of said skirts of said first ply.

3. The pneumatic tire in accordance with claim 1 or claim 2 wherein said third ply has an axial width greater than the axial distance between said free lateral edges.

4. The pneumatic tire in accordance withh claim 1 or claim 2 having filiformm elements in said first ply composed of an aromatic polyamide having a modulus of elasticity in excess of 3,500 kg/sq. mm.

5. The pneumatic tire in accordance with claim 1 or claim 2 having filiform elements in said second ply composed of an aromatic polyamide.

6. The pneumatic tire in accordance with claim 1 or claim 2 having filiform elements in said second ply formed of steel.

7. The pneumatic tire in accordance with claim 1 or claim 2 having filiform elements in said third ply formed of steel.

* * * * *